United States Patent Office 3,453,984
Patented July 8, 1969

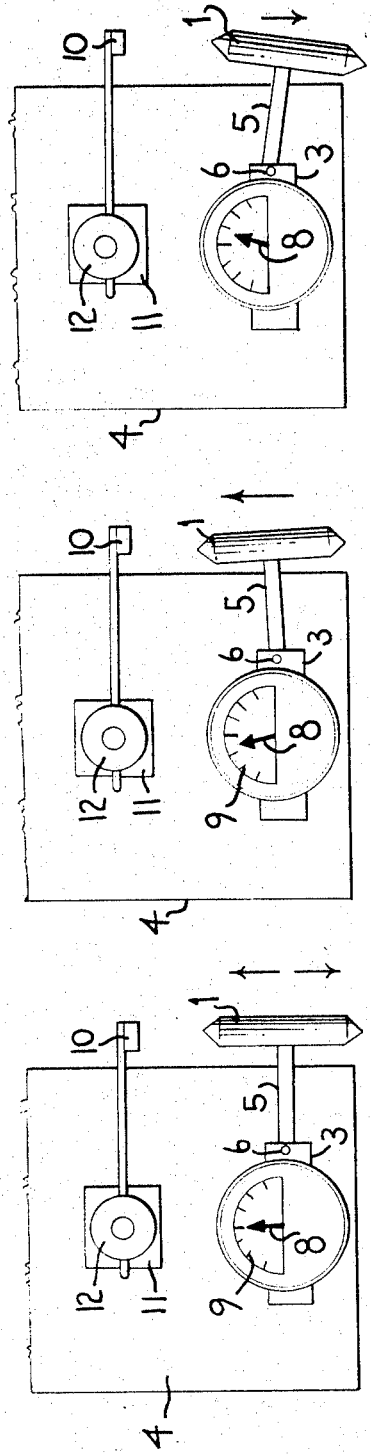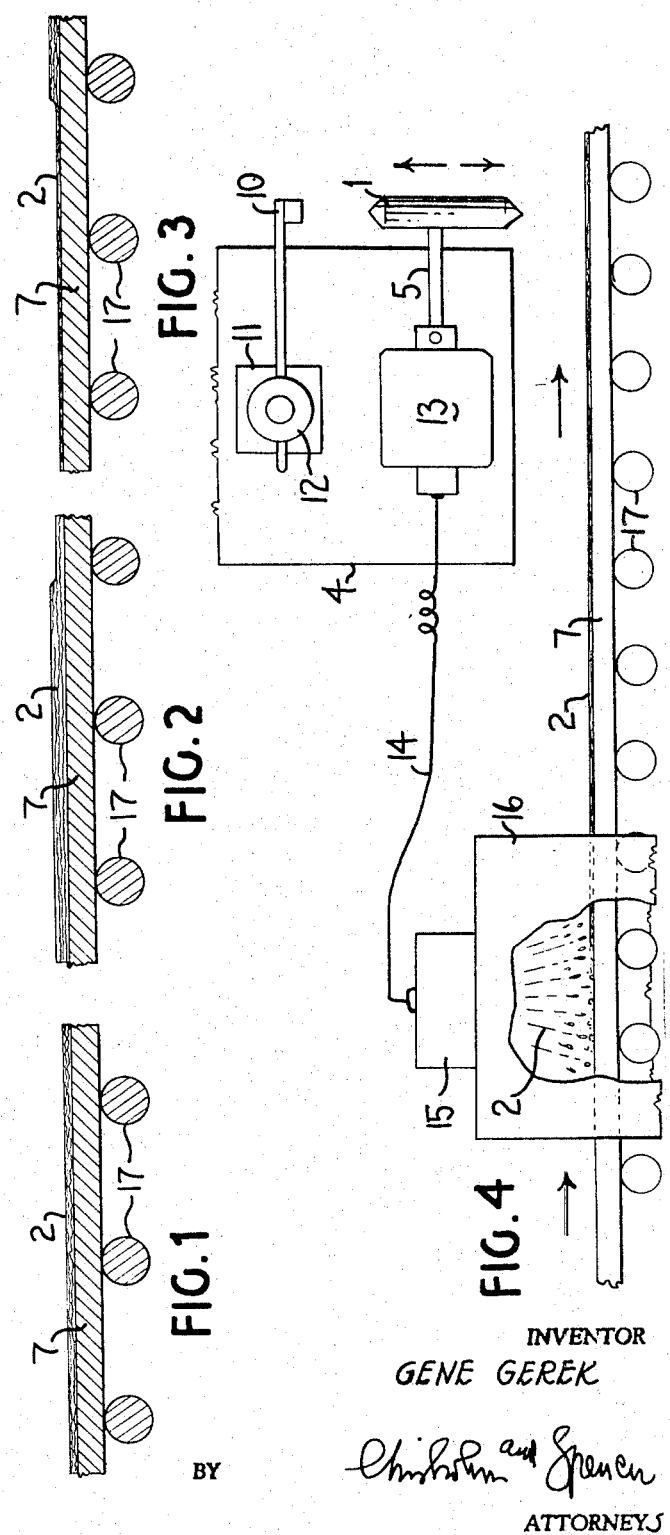

3,453,984
APPARATUS FOR MEASURING AND CONTROLLING FILM THICKNESS
Gene Gerek, Cheswick, Pa., assignor to PPG Industries, Inc., a corporation of Pennsylvania
Filed Sept. 16, 1966, Ser. No. 580,052
Int. Cl. G01r 33/00; B05c 11/02
U.S. Cl. 118—8          5 Claims

ABSTRACT OF THE DISCLOSURE

The measurement and control of the thickness of coatings on a magnetic substrate is achieved with an apparatus comprising a substrate of magnetic material, a moveable magnet adjacent to said magnetic substrate, and a magnetic means on the other side of the magnet, whereby said magnet is balanced by the magnetic force exerted by the magnetic substrate on the one hand and the magnetic element on the other side of the magnet on the other hand.

---

This invention relates to an apparatus for magnetically measuring the thickness of a layer of material and, more particularly, the application of this apparatus in continuously measuring and controlling the thickness of a non-magnetic coating which is being applied to a moving strip having a magnetic substrate.

The application of non-magnetic coatings to magnetic substrates serves many useful purposes, such as surface protection, ornamentation, and insulation. An especially important coating application is that of organic coatings on metal beverage or food containers, where the base metal might impart or absorb odor or otherwise contaminate the food if it is in direct contact with the substrate. This area of application constitutes by itself a major industry, employing a wide variety of organic coatings which are sprayed or otherwise applied as liners for the containers.

The widespread utilization of coatings on magnetic bases has prompted increasing work both in the development of accurate and reliable instruments for measuring the thickness of such coatings and the employment of such instruments in devices for controlling the thickness of the coating as it is being applied. Such latter devices are especially important since the accurate measuremhent of coating thickness solves only half of the problems involved in most coating applications.

For example, beverage containers are usually coated on assembly lines and subjected to occasional or routine measurements of coating thickness. If the thickness of the coating being applied is above or below that desired, as often occurs with the most modern coating equipment, such fact is discovered only after a substantial number of containers have already been so coated. It is then periodically necessary to stop the assembly line in order to adjust the coating applicator, at the same time either re-coating or discarding entirely the defectively coated containers, with a resultant significant increase in coating costs.

Numerous instruments operating on the magnetic shunting principle have been developed to measure coating thickness. That is, when a non-magnetic material is placed in an air gap between a magnet and a magnetic substrate, the intensity of the air gap field is proportional to the thickness of the non-magnetic material. Such devices have usually employed spring means for urging the magnet away from the air gap, as shown in U.S. Patent No. 2,637,115. They have not, however, provided the degree of accuracy usually required to assure correct coating thickness, especially in the area of beverage and food container liners, and further refinements have been generally as ineffective. Moreover, since spring means usually provide a strong force, capable of producing a large motion in consequence to a very slight movement apart of the elements of the magnetic couple, such devices are usually not usable in an apparatus for controlling film thickness, where continuous and gradual response to coating thickness variations is required.

It has now been discovered that a simple, but extremely sensitive, measuring device is attainable by employing a magnet selectively moving across one of two gaps, the direction of motion depending upon which gap exhibits the least amount of magnetic reluctance, with this motion being related to the thickness of the material within one of the gaps. Such device is not only extremely accurate but is also especially suitable for use in both measuring and controlling the thickness of a coating as it is being applied.

In all instances, the magnet can move selectively across one of two air gaps, that is, either toward a magnetic member, forming one gap, or toward a magnetic base element, forming the other gap, depending solely upon the magnetic attraction across each gap. Variations in a predetermined thickness of the layer to be measured will cause the magnet to recurrently move toward and away from one of such elements in a continuous and gradual motion. After the coating applicator has been adjusted to provide a correct coating thickness, the magnet will automatically return to an equilibrium position, where the opposing forces are approximately equal, until further irregularities occur. The magnet is not subjected to sudden forces as with spring or other biasing means, but rather responds gradually according to very slight variations of the coating thickness. This opposition of substantially equivalent forces results in an extremely sensitive mechanism and accurate thickness determinations can be made of up to ±0.01 mil.

The outstanding sensitivity of this device, as well as its other properties, makes it especially adaptable to continuous coating processes where it is desired to not only measure the coating on a moving strip, but also to automatically control the coating applicator. Means can be used to convert the continuous movement of the magnet into electric current, for example, which in turn can power a servo-slave motor or similar means for automatically adjusting the coating apparatus to provide uniform coating thickness.

Of the accompanying drawings, FIGURE 1 is a side view of a simple device embodying the principles of this invention and illustrating the normal or equilibrium position of the magnet 1, when the coating 2 is of the desired thickness. The magnet 1 is connected to conventional indicating means 3, mounted on frame 4, by means of arm 5, pivotable at pin 6, which allows the magnet 1 to move toward and away from the magnetic substrate 7, supported on rollers 17, in the direction of the arrows. The pointer 8 of the indicating means 3, in response to the movement of the magnet 1, gives a direct reading of coating thickness by its movement along a calibrated scale 9. A magnetic member 10 is movably mounted on frame 4 in a position whereby its force of attraction on the magnet 1 is balanced by that of the substrate 7. The measuring apparatus has been standardized by means of positioning device 11, having a dial 12, mounted on frame 4 and operatively connected with magnetic member 10 in such manner that adjustment of dial 12 causes magnetic member 10 to be moved toward or away from the magnet 1.

FIGURE 2 is the view of FIGURE 1 illustrating the reaction of the device when the coating 2 exceeds a predetermined thickness, such as that shown in FIGURE 1. The magnet 1 has moved away from the magnetic substrate 7 toward the magnetic member 10, in the direction indicated by the arrow, thereby causing movement of the pivot arm 5, which in turn actuates the indicating means 3 with a resultant movement of the point 8 along the calibrated scale 9, giving a reading of excess coating thickness.

Similarly, FIGURE 3 is a view of FIGURE 1 illustrating the reaction of the device when the coating 2 falls below the predetermined thickness shown in FIGURE 1.

FIGURE 4 is a side view of an apparatus for controlling the thickness of a non-magnetic coating 2 as it is being applied to a moving magnetic strip 7. The measuring component of the apparatus is identical to the devices shown in FIGURES 1 to 3, except that servo-slave motor 13 has been substituted for the indicating means 3 of the above figures. As the coated magnetic strip 7 moves in the direction of the arrow, the thickness of the coating is continuously monitored by movement of the magnet 1 and pivot arm 5 as above, in response to which the servo-slave motor 13 sends out electric impulses along line 14 to activate control means 15, which in turn controls the rate of coating by the applicator 16. The servo-slave motor, or similar device, and the control means for the coating applicator are those conventionally utilized in a variety of applications.

The procedure followed in utilizing the apparatus of this invention in both measuring and controlling the thickness of the coating composition as it is applied may vary according to the specific end use, but usually, in coating food or beverage containers, consists of spraying the film using standard equipment, flashing the coating to remove the solvent and measuring the dried film thickness with resulting automatic adjustment of the spray equipment.

Usually, the apparatus is employed with organic coatings such as vinyl halide resins, alkyd resins, hydrocarbon resins, acrylic resins, amino resins, epoxy resins, polyester resins, organopolysiloxane resins, phenolic resins, and the like, on magnetic substrates such as iron, steel, nickel, etc. Plated films of non-magnetic materials such as chromium, copper, tin, zinc, brass, silver and gold may also be measured. In still other cases, there may be a magnetic coating such as nickel, on a non-magnetic base such as brass.

Variations in the thickness of the magnetic substrate generally have no appreciable effect upon the operation of the present apparatus. In the event that the thickness of the magnetic substrate is less than desired, however, compensation for this fact may be had by utilizing a magnetic reference bar or piece as the magnetic substrate for the material being measured.

Generally, the magnet employed is formed from a material possessing permanent magnetic qualities, although it is possible and sometimes preferred to employ an electromagnet in a suitable electric circuit, as described in U.S. Patent Nos. 2,299,997 and 2,438,506, along with the well-known type of balancing circuits employed with such electromagnets.

As alluded to above, the apparatus of this invention is not limited to thickness measurements only of non-magnetic coatings on magnetic substrates, but includes also measurements of the thickness of any layer of material in a magnetic gap. That is, the magnetic couple may consist of a magnet and the magnetic substrate of a coated strip or, in other cases, when a magnetic layer of material such as a strip of steel is measured, the strip itself comprises, with the magnet, the magnetic couple.

Similarly, the magnetic element, corresponding to member 10 of the drawings, which is employed to provide the opposing magnetic force on the magnet, may be positioned adjacent to a second magnet and linked to the first, or measuring, magnet to thereby exert indirect magnetic force on the first magnet. It is only necessary that the opposing force be caused by magnetic means, as indicated in the drawings where a direct magnetic force is present between the magnetic member and the magnet.

A specific and preferred apparatus of this invention utilizes a permanent magnet which is urged away from a steel sheet by a movable iron rod, in accordance with the principle described in FIG. 1. When a vinylidene fluoride coating, for example, is formed on the steel sheet in a predetermined thickness, the magnet is preferentially attracted to the iron rod. The iron rod is then moved away from the magnet until an equilibrium position is reached. The apparatus is thereby standardized and made ready for measurements of film thickness in the manner described above.

What is claimed is:

1. An apparatus for magnetically measuring the thickness of a layer of material which comprises: a magnetic base element; a magnet located adjacent to said magnetic base element and mounted to move toward or away from said magnetic base element, means to continuously move said magnetic base element in a direction perpendicular to the plane formed by the base element and the magnet; a magnetic means adjacent to said magnet and exerting a magnetic force on said magnet whereby the force of attraction between said magnet and said magnetic base element is substantially balanced by the magnetic force exerted by said magnetic means upon said magnet so that when the layer of material to be measured is placed in the gap between said magnetic base element and said magnet, variations in the thickness of the layer will cause said magnet to recurrently move toward or away from said magnetic base element in a continuous and gradual motion; and means for converting movement of said magnet into an indication of the thickness of the layer of material.

2. The apparatus of claim 1 wherein the magnetic means is a magnetic member exerting a direct magnetic force of attraction upon the magnet.

3. The apparatus of claim 1 wherein the magnetic base element comprises a magnetic substrate of a strip or sheet of magnetic material having a layer of material to be measured as a coating thereon.

4. An apparatus for magnetically measuring the thickness of a non-magnetic coating on a magnetic substrate comprising a magnet located adjacent to the non-magnetic coating and mounted to move toward and away from such layer, means to continuously move said magnetic substrate in a direction perpendicular to the plane formed by the substrate and the magnet, a magnetic member mounted in a position whereby the force of attraction between said magnet and said magnetic member is substantially balanced by the force of attraction between said magnet and the magnetic substrate so that when the thickness of the coating varies from a predetermined value, said magnet will recurrently move either toward or away from the magnetic substrate, depending upon which air gap offers the least resistance; and means for converting movement of said magnet into an indication of the thickness of the non-magnetic coating.

5. An apparatus for controlling the thickness of a non-magnetic coating as it is being applied to a magnetic substrate which comprises a magnet located adjacent to the non-magnetic coating and mounted to move toward and away from such layer, means to continuously move said magnetic substrate in a direction perpendicular to the plane formed by the substrate and the magnet; a magnetic member mounted in a position whereby the force of attraction between said magnet and said magnetic member is substantially balanced by the force of attraction between said magnet and the magnetic substrate so that when the thickness of the non-magnetic coating varies from a predetermined value, said magnet will recurrently move either toward or away from the non-magnetic coating in a continuous and gradual motion, depending upon which air gap offers the least resistance; and control means sensitive to the movement of said magnet for controlling the mechanism applying the coating.

References Cited

UNITED STATES PATENTS 2,384,529  9/1945  Breitenstein.
2,637,115  5/1953  Watson.
3,086,889  4/1963  Strong _____ 118—8 X WALTER A. SCHEEL, *Primary Examiner.*

J. P. McINTOSH, *Assistant Examiner.*

U.S. Cl. X.R.

118—9 10; 324—34